United States Patent
Kimura et al.

(10) Patent No.: US 9,995,272 B1
(45) Date of Patent: Jun. 12, 2018

(54) WIND TURBINE BLADE AND REINFORCING METHOD FOR WIND TURBINE BLADE

(71) Applicant: MITSUBISHI HEAVY INDUSTRIES, LTD., Tokyo (JP)

(72) Inventors: Yasutaka Kimura, Tokyo (JP); Takao Kuroiwa, Tokyo (JP); Kouji Esaki, Tokyo (JP); Toshiyuki Hirano, Tokyo (JP); Kentaro Shindo, Tokyo (JP); Takeshi Fujita, Tokyo (JP); Keisuke Ota, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days. days.

(21) Appl. No.: 15/697,643

(22) Filed: Sep. 7, 2017

(30) Foreign Application Priority Data

Feb. 9, 2017 (JP) .................................. 2017-021889

(51) Int. Cl.
*F03D 1/06* (2006.01)
(52) U.S. Cl.
CPC ......... *F03D 1/0658* (2013.01); *F03D 1/0633* (2013.01); *F03D 1/0675* (2013.01); *F05B 2240/21* (2013.01); *F05B 2240/301* (2013.01); *F05B 2260/30* (2013.01)
(58) Field of Classification Search
CPC ..... F03D 1/0633; F03D 1/0658; F03D 1/0675
See application file for complete search history.

(56) References Cited

U.S. PATENT DOCUMENTS

| | | | | |
|---|---|---|---|---|
| 4,915,590 A * | 4/1990 | Eckland | ............... | F03D 1/0658 29/889.21 |
| 5,458,465 A * | 10/1995 | von Wieser | ........... | F04D 29/023 416/214 R |
| 6,371,730 B1 * | 4/2002 | Wobben | ............... | F03D 1/0658 416/204 R |
| 7,322,798 B2 | 1/2008 | Cairo | | |
| 7,427,189 B2 * | 9/2008 | Eyb | ........................ | F03D 1/065 416/226 |
| 7,438,533 B2 * | 10/2008 | Eyb | ...................... | F03D 1/0658 416/230 |
| 8,043,067 B2 * | 10/2011 | Kuroiwa | ............... | F03D 1/0675 416/223 R |

(Continued)

FOREIGN PATENT DOCUMENTS

| | | |
|---|---|---|
| EP | 2615304 A1 | 7/2013 |
| EP | 2733350 A2 | 5/2014 |

(Continued)

*Primary Examiner* — Woody Lee, Jr.
(74) *Attorney, Agent, or Firm* — Manabu Kanesaka; Benjamin Hauptman; Kenneth Berner (57) ABSTRACT

Provided are a wind turbine blade, with which effective reinforcement against possible flexural deformation in a longitudinal direction is realized, and a reinforcing method for the wind turbine blade. The wind turbine blade includes a hollow blade main body having a cylindrical blade root portion and extending from the blade root portion along a blade length direction, and a reinforcing plate provided in contact with an inside surface of the blade root portion and formed of an elongated member having a dimension along the blade length direction that is larger than a dimension along a circumferential direction of the blade root portion.

14 Claims, 8 Drawing Sheets

(56) References Cited

U.S. PATENT DOCUMENTS

| | | | |
|---|---|---|---|
| 8,091,229 B2 | 1/2012 | Deak et al. | |
| 8,105,040 B2 * | 1/2012 | Vronsky | F03D 1/0658 |
| | | | 416/204 R |
| 8,172,542 B2 * | 5/2012 | Hirano | F03D 1/0675 |
| | | | 416/226 |
| 8,186,960 B2 * | 5/2012 | Dawson | B23P 6/00 |
| | | | 416/204 R |
| 8,826,534 B2 | 9/2014 | Cappelli et al. | |
| 9,410,529 B2 * | 8/2016 | Grove-Nielsen | F03D 1/001 |
| 9,719,489 B2 * | 8/2017 | Stewart | F03D 1/0675 |
| 9,745,956 B2 * | 8/2017 | Johnson | F03D 1/0683 |
| 2010/0086409 A1 * | 4/2010 | Whiley | F03D 1/0658 |
| | | | 416/220 R |
| 2010/0135820 A1 | 6/2010 | Olson | |
| 2011/0031758 A1 * | 2/2011 | Mitsuoka | B32B 15/06 |
| | | | 290/55 |
| 2011/0052403 A1 * | 3/2011 | Kawasetsu | F03D 1/0675 |
| | | | 416/226 |
| 2011/0187115 A1 * | 8/2011 | Piasecki | B23P 15/04 |
| | | | 290/55 |
| 2011/0200446 A1 * | 8/2011 | Garcia | F03D 1/0658 |
| | | | 416/226 |
| 2015/0093250 A1 | 4/2015 | Busbey et al. | |
| 2016/0201645 A1 * | 7/2016 | Jensen | F03D 1/0675 |
| | | | 416/223 R |

FOREIGN PATENT DOCUMENTS

| | | |
|---|---|---|
| WO | 2016/079535 A1 | 5/2016 |
| WO | 2016/150445 A1 | 9/2016 |

* cited by examiner

WIND TURBINE BLADE AND REINFORCING METHOD FOR WIND TURBINE BLADE

RELATED APPLICATIONS

The present application is based on, and claims priority from, Japanese Application No. JP2017-021889 filed Feb. 9, 2017, the disclosure of which is hereby incorporated by reference herein in its entirety.

TECHNICAL HELD

The disclosure relates to a wind turbine blade and a reinforcing method for a wind turbine blade.

BACKGROUND

In recent years, wind turbine generator systems utilizing wind power have been increasingly prevalent in view of conservation of global environment. The wind turbine generator system converts kinetic energy of a wind into rotary energy of a wind turbine rotor including wind turbine blades and a hub, and further coverts the rotary energy into electric power energy using a generator.

While the wind turbine generator system is in operation, the wind turbine rotor is subjected to an aerodynamic load from the wind. The length of each wind turbine blade has been increasing consistently with the growing size of the wind turbine generator system. This also increases aerodynamic loads acting on the wind turbine blades and thus a load imposed on each blade root portion.

As a method for suppressing the adverse effects of such an aerodynamic load, Patent Document 1 discloses a technique in which reinforcing ribs are arranged on an inside surface of the cylindrical blade root portion along a circumferential direction to reduce the deformation of the blade root portion, more specifically, to reduce the ovalization of the blade root portion.

CITATION LIST

Patent Literature

Patent Document 1: US 2015-093250 A1

SUMMARY

In the reinforcing technique described in Patent Document 1, the reinforcing ribs are arranged in the circumferential direction in order to suppress deformation of the circular blade root portion. The technique focuses on and deals with suppression of ovalization of the blade root portion. However, the reinforcing method coping with loads imposed on the wind turbine blades is not limited to this.

Thus, an object of at least one embodiment of the present invention is to provide a wind turbine blade that enables effective reinforcement against possible flexural deformation of the blade root portion in a longitudinal direction, and a reinforcing method for the wind turbine blade.

(1) A wind turbine blade according to at least one embodiment includes:
   a hollow blade main body having a cylindrical blade root portion and extending from the blade root portion along a blade length direction; and
   a reinforcing plate provided in contact with an inside surface of the blade root portion and formed of an elongated member having a dimension along the blade length direction that is larger than a dimension along a. circumferential direction of the blade root portion.

In the configuration in (1), the wind turbine blade may be reinforced by the reinforcing plate provided in contact with the inside surface of the blade root portion of the wind turbine blade. In this case, the dimension, along the blade length direction, of the elongated member forming the reinforcing plate is larger than the dimension along the circumferential direction of the blade root portion of the elongated member. This enables effective reinforcement against possible flexural deformation in a longitudinal direction of the wind turbine blade, improving fatigue strength of the wind turbine blade. Such reinforcement for the wind turbine blade allows the life of the wind turbine blade to be extended.

(2) In several embodiments, in the configuration in (1),
   the reinforcing plate is provided on at least one of a pressure side and a suction side of the blade root portion.

Among aerodynamic loads imposed on the wind turbine blade, a load acting in a flap direction is dominant. Thus, a heavy load is imposed on the blade root portion in the flap direction.

In the configuration in (2), the reinforcing plate is arranged and configured taking into account a load imposed on the blade root portion in the flap direction, enabling effective reinforcement against the load imposed on the blade root portion in the flap direction.

(3) In several embodiments, in the configuration in (1) or (2),
   the blade main body includes a plurality of laminated layers of fiber reinforced resin, and
   the reinforcing plate is provided at least in an area of the blade root portion where a thickness of the laminated layers of the fiber reinforced resin varies.

In the configuration in (3), effective reinforcement may be provided in the area of the blade root portion where the thickness of the laminated layers of the fiber reinforced resin varies, that is, the area where strength varies.

(4) In several embodiments, in the configuration in any one of (1) to (3),
   the reinforcing plate is provided with a through-hole, through which an adhesive is injected, into a space between the inside surface of the blade root portion and the reinforcing plate.

In the configuration in (4), the adhesive may be appropriately injected through the through-hole, into the space between the inside surface of the blade root portion and the reinforcing plate. Therefore, the strength of adhesion between the reinforcing plate and the blade main body may be improved.

(5) In several embodiments, in the configuration in any one of (1) to (4),
   the reinforcing plate is shaped along the inside surface of the blade root portion.

Unlike a configuration in which the reinforcing plate has a shape irrelevant to the inside surface of the blade root portion, the configuration in (5) allows a gap with a substantially uniform size to be formed between the inside surface of the blade root portion and the reinforcing plate. Consequently, if the reinforcing plate is attached to the inside surface of the blade root portion, for example, using the adhesive, the adhesive strength of the reinforcing plate may be improved.

(6) In several embodiments, in the configuration in any one of (1) to (5), the reinforcing plate is attached to the inside surface of the blade root portion with an adhesive, and the adhesive is provided around the reinforcing plate so as to be tapered cross-sectionally.

In the configuration in (6), the adhesive is provided so as to be tapered cross-sectionally, enabling possible stress concentration to be avoided to allow the adhesive strength to be improved.

(7) In several embodiments, in the configuration in any one of(6), the blade main body includes:

a suction-side half section and a pressure-side half section that is joined to the suction-side half section, and the reinforcing plate is provided, in a cross section of the blade root portion, near a center of a circular arc defined by at least one of the suction-side half section or the pressure-side half section.

In the configuration in (7), the reinforcing plate is provided away from the junction between the suction-side half section and the pressure-side half section. Thus, even when the suction-side half section and the pressure-side half section are separated from each other, an installing operation for the reinforcing plate may be performed.

Adoption of the arrangement and configuration of the reinforcing plate described in (7) enables effective reinforcement against the load imposed on the blade root portion in the flap direction.

(8) In several embodiments, in the configuration in (7), the reinforcing plate is provided within an angular range of $\theta_0-50 \leq \theta \leq \theta_0+50$ when an angular position of the center of the circular arc in the circumferential direction of the blade root portion is denoted by $\theta_0$ [°].

In the configuration in (8), the reinforcing plate can be forcibly provided at the appropriate position.

(9) In several embodiments, the configuration in any one of (1) to (8) further includes a partitioning plate provided in the blade root portion to partition an internal space of the blade main body into a root area and a tip area, and the partitioning plate has an opening through which the reinforcing plate penetrates.

In the configuration in (9), even in the wind turbine blade with the partitioning plate, a reinforcing plate that is sufficiently long in the blade length direction may be appropriately provided to enable more effective reinforcement against possible flexural deformation of the wind turbine blade in the longitudinal direction.

(10) in several embodiments, the configuration in (9) further includes a cover plate provided adjacent to the partitioning plate in the blade length direction so as to close the opening.

In the configuration in (10), foreign matter and the like may be restrained from moving into the wind turbine blade via the opening. The cover plate may compensate for a reduced rigidity of the partitioning plate attributed to the presence of the opening.

(11) A reinforcing method for a wind turbine blade according to at least one embodiment of the present invention includes:

a placing step of placing a reinforcing plate inside a blade root portion of a hollow blade main body extending from a blade root along a blade length direction, the reinforcing plate being formed of an elongated member having a dimension along the blade length direction that is larger than a dimension along a circumferential direction of the blade root portion; and a bonding step of bonding fixedly the placed reinforcing plate to an inside surface of the blade root portion.

In the configuration in (11), the wind turbine blade may be reinforced by the reinforcing plate fixedly bonded to the inside surface of the blade root portion of the wind turbine blade. In this case, the reinforcing plate is arranged such that the dimension of the reinforcing plate along the blade length direction is larger than the dimension along the circumferential direction of the blade root portion of the reinforcing plate. This enables effective reinforcement against possible flexural deformation in the longitudinal direction of the wind turbine blade, improving the fatigue strength of the wind turbine blade. Furthermore, the reinforcing plate is attached to the inside surface of the blade root portion by bonding, allowing an attaching operation for the reinforcing plate to be easily performed.

(12) In several embodiments, in the method (11), in the placing step, the reinforcing plate is placed on the inside surface of the blade root portion via a spacer, and in the bonding step, an adhesive is injected into a space formed by the spacer between the reinforcing plate and the inside surface of the blade root portion.

In the method in (12). the provision of the spacer allows the adhesive to be appropriately injected into the space between the inside surface of the blade root portion and the reinforcing plate. Therefore, the strength of adhesion between the reinforcing plate and the blade main body may be improved.

(13) In several embodiments, in the method in (11) or (12), the reinforcing plate includes a through-hole into which an adhesive is injected, and the bonding step includes a step of providing the adhesive around the reinforcing plate and a step of injecting the adhesive through the opening.

In the method in (13), the adhesive may be appropriately injected into the space between the inside surface of the blade root portion and the reinforcing plate through the through-hole, allowing work efficiency to be improved.

(14) In several embodiments, the method in any one of (11) to (13) further includes a stopping step of stopping a wind turbine rotor such that the wind turbine blade to be reinforced is positioned within a first azimuth angular range of 60 degrees or more and 120 degrees or less or a second azimuth angular range of 240 degrees or more and 300 degrees or less, and the placing step is executed after the stopping step.

In the method in (14), an environment enabling an attaching operation for the reinforcing plate to be achieved inside the wind turbine blade may be provided for operators without the need to lower the wind turbine blade to the ground. This enables a reduction in the scale of construction to allow cost advantages to be enjoyed.

(15) In several embodiments, in the method in (14), in the stopping step, a pitch angle of the wind turbine blade to be reinforced is shifted to a feather side, and in the placing step, the reinforcing plate is attached to at least one of a pressure side or a suction side of the blade root portion.

In the method in (15), the operators may perform a reinforcing operation (a bonding operation for the reinforcing plate) using a pressure-side area or a suction-side area of the blade root portion as a floor surface. This improves the safety of the reinforcing operation.

At least one embodiment of the present invention may provide a wind turbine blade that enables effective reinforcement against possible flexural deformation of the blade root portion in a longitudinal direction, and a reinforcing method for the wind turbine blade.

DETAILED DESCRIPTION

Several embodiments of the present invention will be described below with reference to the attached drawings. However, dimensions, materials, shapes, relative arrangements, and the like of components described in the embodiments or depicted in the drawings are not intended to limit the scope of the present invention thereto and are only illustrative.

Figure 1:
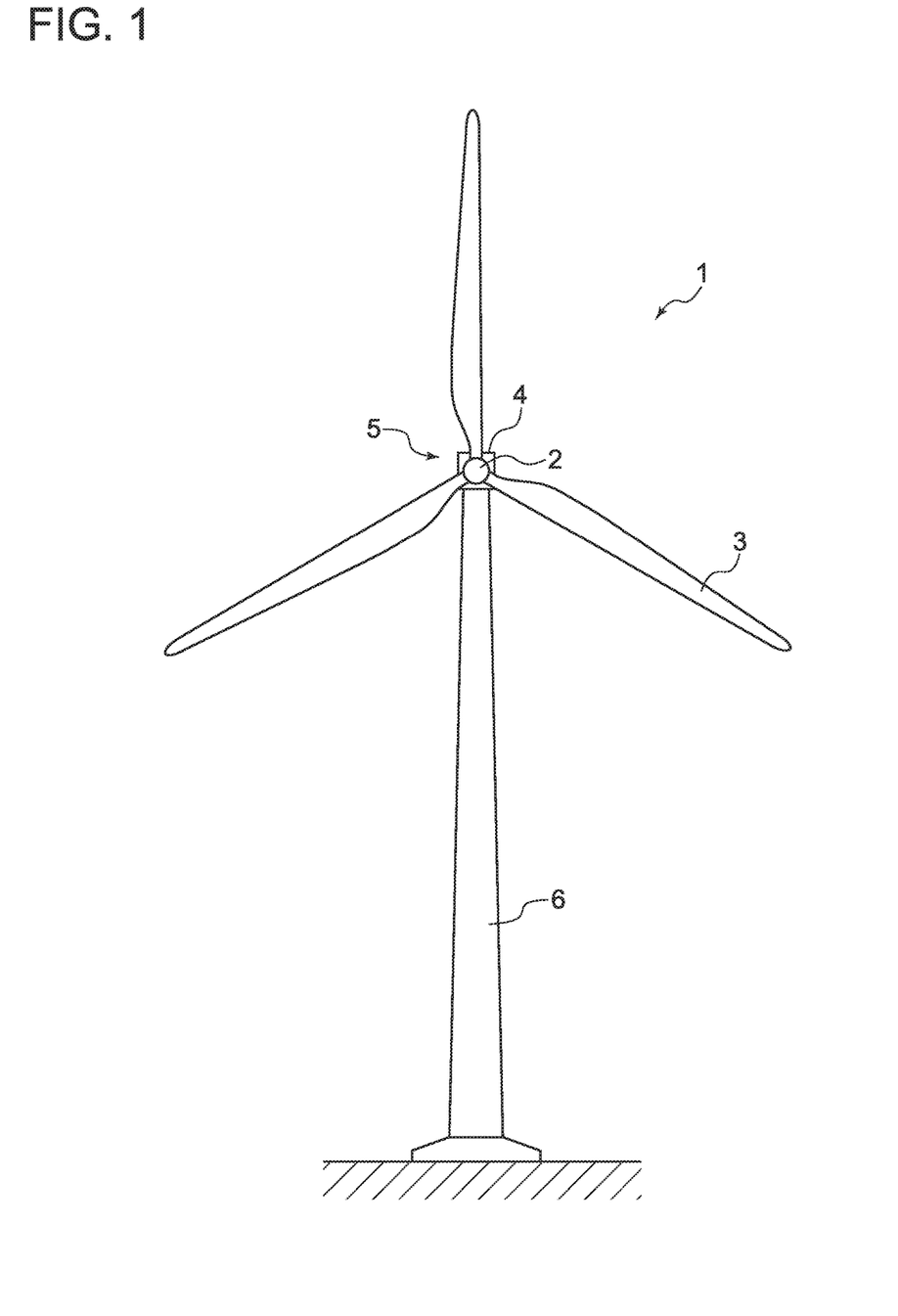
FIG. 1 is a schematic diagram depicting a general configuration of a windmill according to an embodiment.

First, description will be given that relates to a configuration of a windmill including wind turbine blades for which a blade reinforcing process (reinforcing operation) is intended according to an embodiment. FIG. 1 is a schematic diagram depicting a general configuration of a windmill according to an embodiment. As depicted in FIG. 1, a windmill 1 includes a wind turbine rotor 5 including at least one wind turbine blade 3 and a hub 2 to which the wind turbine blade 3 is attached. The wind turbine rotor 5 is rotatably supported by a nacelle 4 provided at the top of a tower 6 and supported by the tower 6. When the wind turbine blade 3 is subjected to a wind, the wind turbine rotor 5 including the wind turbine blade 3 rotates.

The windmill 1 is an upwind wind turbine generator system having a plane of rotation of the wind turbine rotor 5 located on an upwind side with respect to the tower 6.

In several embodiments, the windmill 1 may be a part of a wind turbine generator system. in this case, the nacelle 4 may have a generator (not depicted in the drawings) housed therein and a power transmission mechanism (not depicted in the drawings) also housed therein and configured to transmit rotation of the wind turbine rotor 5 to the generator. The wind turbine generator system is configured such that rotary energy is transmitted from the wind turbine rotor 5 to the generator via the power transmission mechanism, with the generator converting the rotary energy into electric energy.

Now, with reference to FIG. 2, loads imposed on the wind turbine blade 3 while the windmill 1 is in operation will be described.

Figure 2:
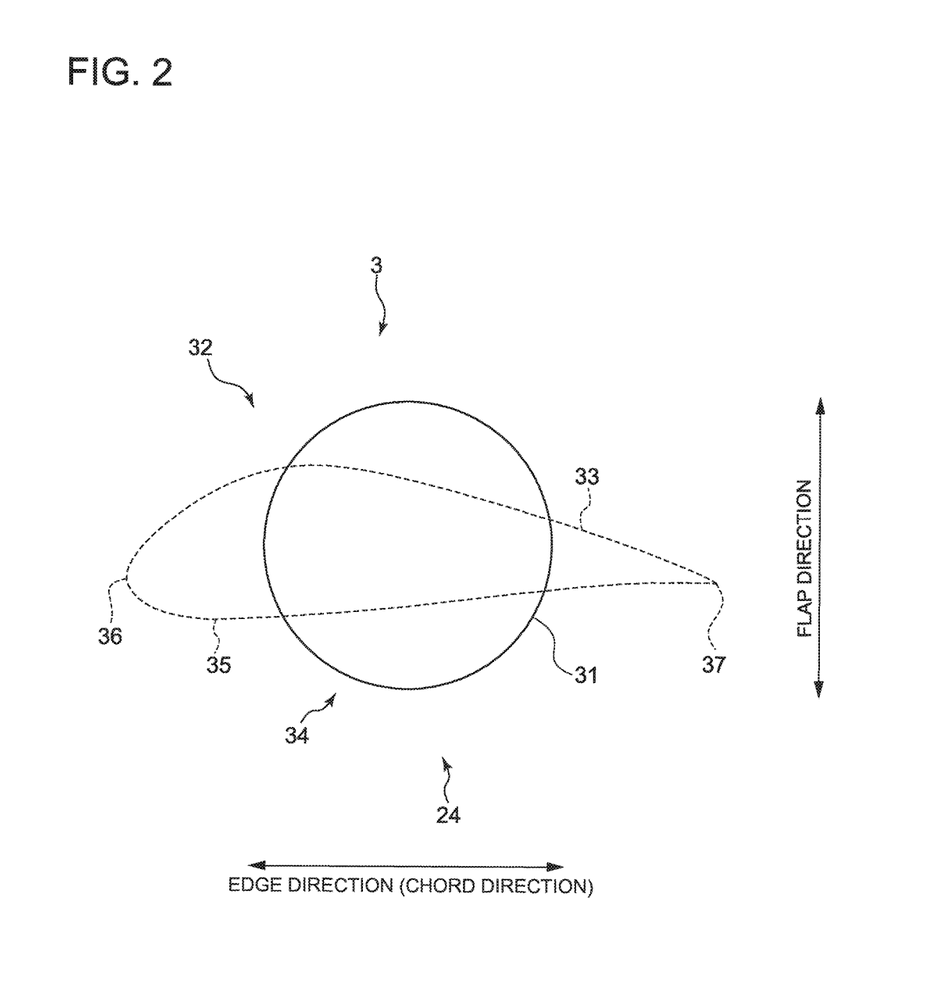
FIG. 2 is a diagram illustrating loads imposed on a blade root portion of a wind turbine blade as viewed from a side surface of the wind turbine blade orthogonal to a longitudinal direction of the blade root portion.

FIG. 2 is a cross-sectional view of a blade root portion 31 of the wind turbine blade 3 depicted in FIG. 1, the view being orthogonal to a longitudinal direction of the wind turbine blade 3. In FIG. 2, the blade root portion 31 of the wind turbine blade 3 is depicted by a solid line and an airfoil portion of the wind turbine blade 3 positioned further toward a blade tip side than the blade root portion 31 is depicted by a dashed line.

As depicted in FIG. 2, the wind turbine blade 3 includes the cylindrical blade root portion 31 and the airfoil portion. The wind turbine blade 3 includes a suction-side coat 33 forming an outer surface of a suction side 32 and a pressure-side coat 35 forming an outer surface of a pressure side 34. The suction-side coat 33 and the pressure-side coat 35 are laminated to each other at a leading edge 36 and a trailing edge 37 of the wind turbine blade 3 via an adhesive. In the specification, the pressure-side coat and the suction-side coat may be collectively referred to as a "coat" or a "blade coat".

While the windmill 1 is in operation, the pressure side 34 of the wind turbine blade 3 faces front (upwind side) and catches a wind, and the pressure side 34 of the wind turbine blade 3 is basically constantly subjected to a positive pressure. Thus, the wind turbine blade 3 is likely to be subjected to a bending load in a direction (flap direction) corresponding to a line with which the suction side 32 and the pressure side 34 are connected together. In other words, the wind turbine blade 3 is affected by loads more significantly in the flap direction than in the edge direction.

The edge direction of the wind turbine blade 3 refers to a chord direction corresponding to a line with which the leading edge and the trailing edge are connected together in a cross section orthogonal to a longitudinal direction of the wind turbine blade 3. The flap direction refers to a direction orthogonal to the chord direction in the same cross section.

Figure 3:
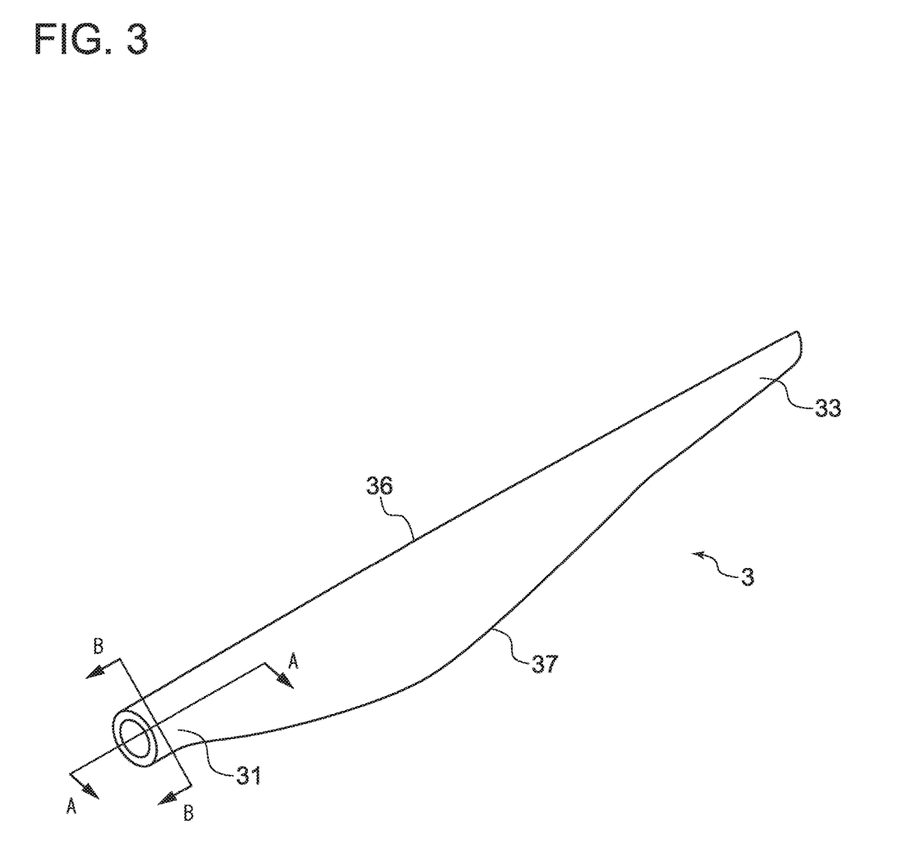
FIG. 3 is a schematic perspective view of the wind turbine blade.

FIG. 3 is a schematic perspective view of the wind turbine blade 3.

As depicted in FIG. 3, the wind turbine blade 3 has the cylindrical blade root portion 31 attached to the hub 2 via a blade pitch bearing. The blade root portion 31 corresponds to, for example, a range of 1 to 3 m from a root side (on which the wind turbine blade 3 is attached to the hub 2) of the wind turbine blade 3. The blade root portion 31 is formed by laminating layers of fiber reinforced resin such as FRP on one another along with the blade coat. The blade root portion 31 is shaped to have a sufficient thickness in order to provide an appropriate strength, whereas the blade coat (the suction-side coat 33 and the pressure-side coat 35) is formed to have a smaller thickness than the blade root portion 31.

The thickness of each of the blade root portion 31 and the blade coat is adjusted by increasing or reducing the number of laminated layers of the reinforced resin. Thus, the wind turbine blade 3 has an area where the thickness of laminated layers of the fiber reinforced resin varies.

Now, with reference to FIG. 4 to FIG. 7, reinforcing plates (7, 8) provided in the blade root portion 31 of the wind turbine blade 3 according to several embodiments will be described.

Figure 4A:
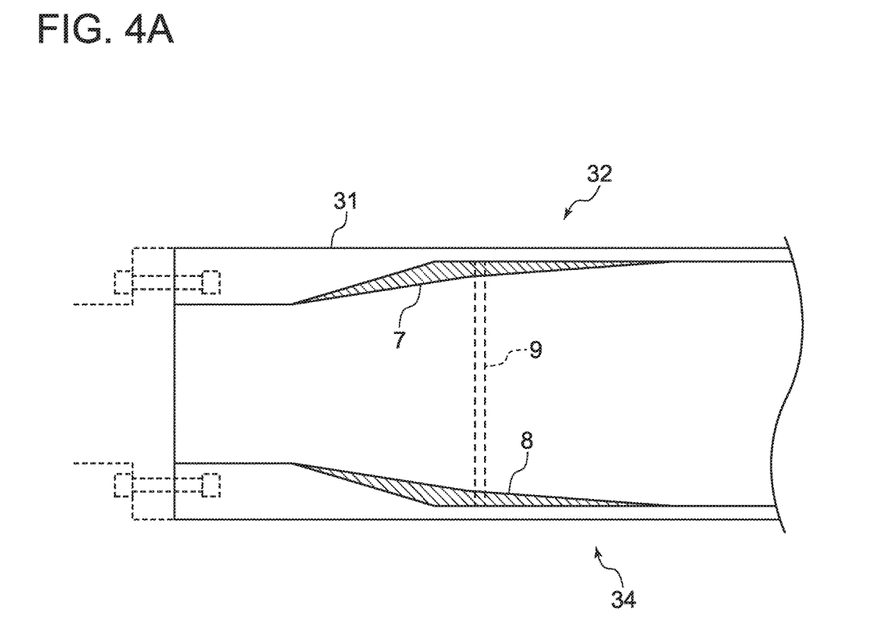
FIG. 4A is a cross-sectional view taken along line A-A in FIG. 3.
Figure 4B:
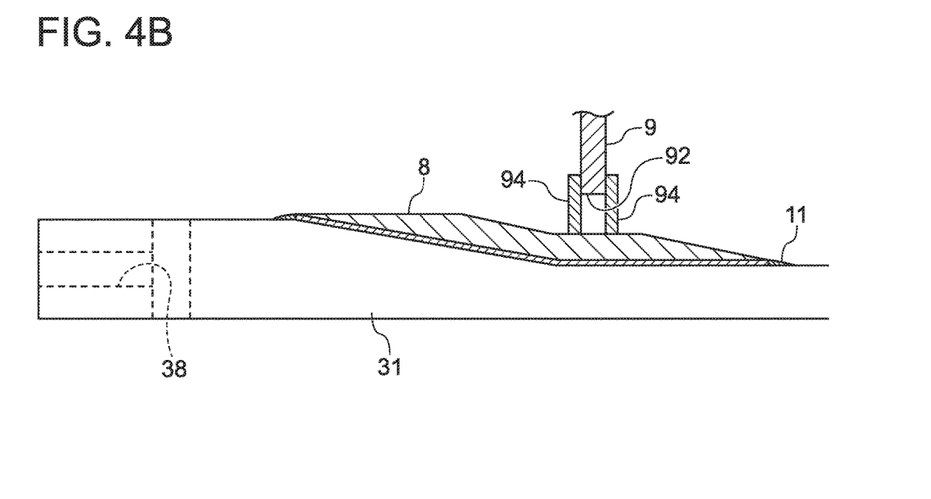
FIG. 4B is an enlarged view schematically depicting a configuration of a periphery of a pressure-side reinforcing plate in FIG. 4A.

FIG. 4A is a cross-sectional view taken along line A-A in FIG. 3, and FIG. 4B is an enlarged view schematically depicting a configuration of a periphery of a pressure-side reinforcing plate in FIG. 4A.

Figure 5A:
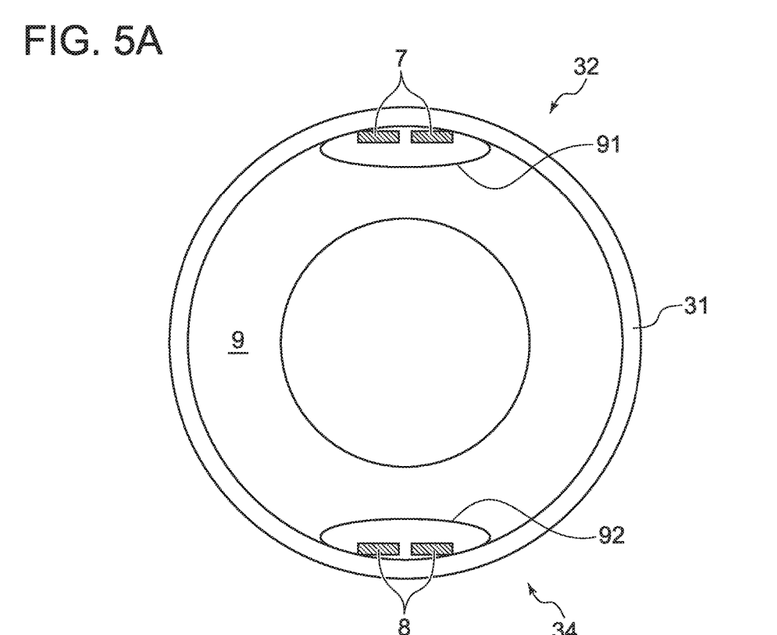
FIG. 5A is a cross-sectional view taken along line B-B in FIG. 3.
Figure 5B:
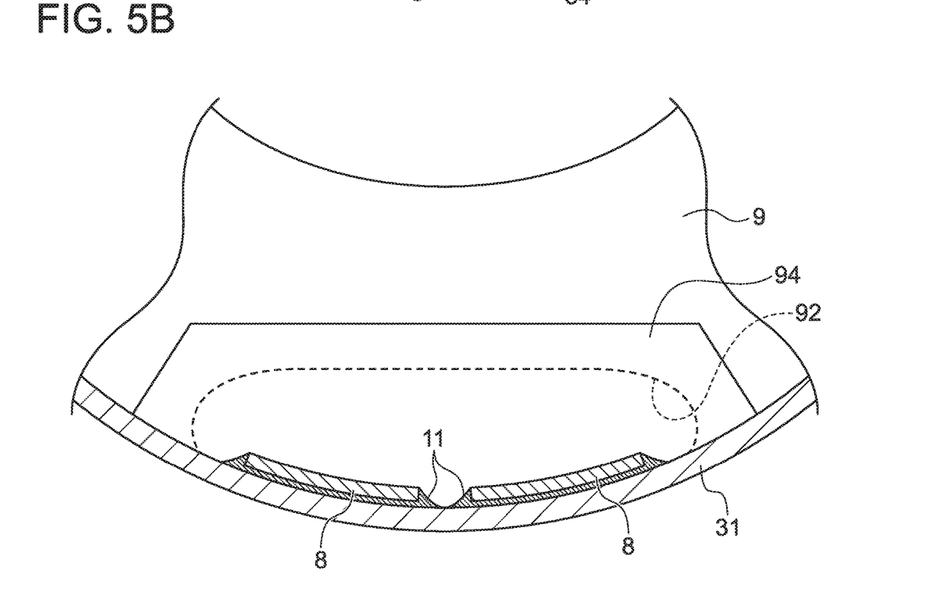
FIG. 5B is an enlarged view schematically depicting a configuration of a periphery of the pressure-side reinforcing plate in FIG. 5A.

FIG. 5A is a cross-sectional view taken along line B-B in FIG. 3, and FIG. 5B is an enlarged view schematically depicting a configuration of a periphery of the pressure-side reinforcing plate in FIG. 5A.

Figure 6:
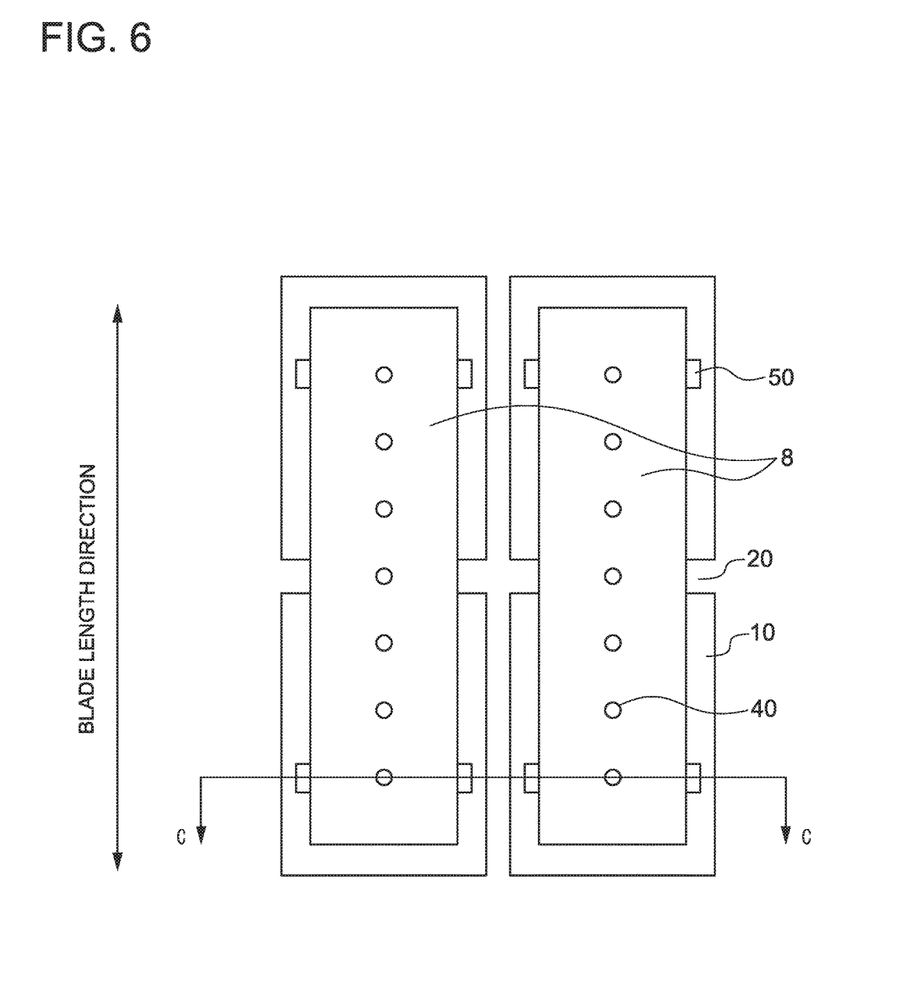
FIG. 6 is a plan view of the pressure-side reinforcing plate as viewed from the inside of the wind turbine blade.

FIG. 6 is a plan view of the pressure-side reinforcing plates as viewed from the inside of the wind turbine blade.

Figure 7:
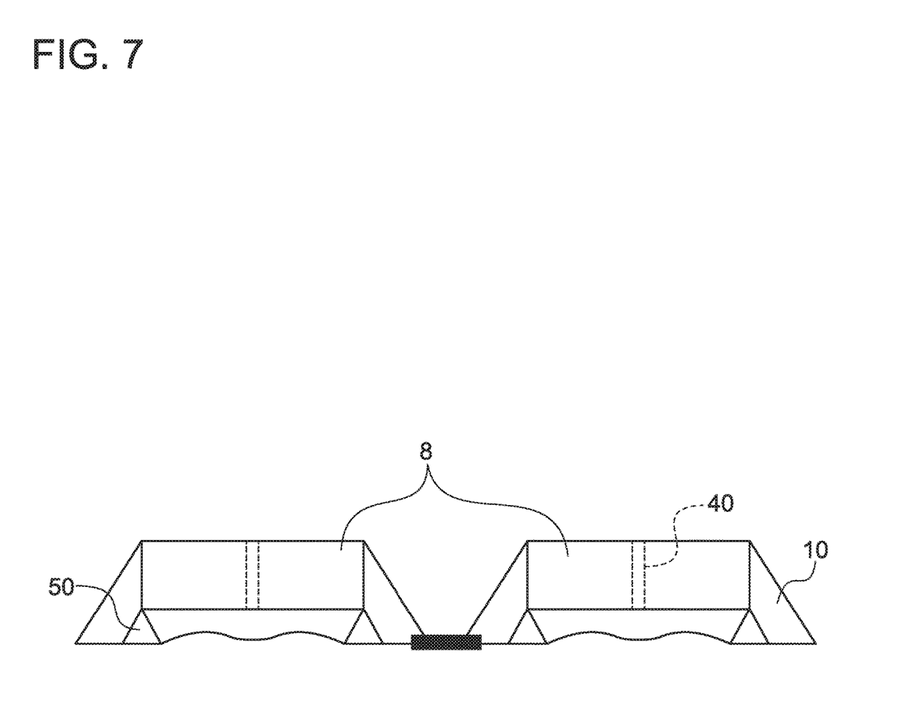
FIG. 7 is a cross-sectional view taken along line C-C in FIG. 6.

FIG. 7 is a cross-sectional view taken along line C-C in FIG. 6.

In several embodiments, the blade root portion 31 of the wind turbine blade 3 according to the present embodiment includes the suction-side reinforcing plate 7 provided on the suction side 32 of an inside surface of the blade root portion 31 and the pressure-side reinforcing plate 8 provided on the pressure side 34 of the inside surface, as depicted in FIG. 4A, FIG. 4B, FIG. 5A, and FIG. 5B. In other embodiments, the reinforcing plate (7, 8) is provided only one of the suction side 32 and the pressure side 34 of the inside surface of the blade root portion 31.

Alternatively, a plurality of the reinforcing plates (7, 8) may be arranged on at least one of the suction side 32 or the pressure side 34 of the inside surface of the blade root portion 31 at a distance from each other in a circumferential direction of the blade root portion 31. In an illustrative embodiment depicted in FIG. 5A and FIG. 5B, a pair of reinforcing plates (the suction-side reinforcing plate 7 and the pressure-side reinforcing plate 8) is arranged on each of the suction side 32 and the pressure side 34 of the inside surface of the blade root portion 31 at a distance from each other in the circumferential direction.

The reinforcing plates (7, 8) are elongated members (prefabricated reinforcing members) pre-produced on the ground (in a factory or a workplace in a wind farm) and arranged along a blade length direction of the wind turbine blade 3, that is, a direction from the blade root toward the blade tip. That is, the dimension of the elongated member forming each of the reinforcing plates (7, 8) attached to the wind turbine blade 3 is larger than the dimension of the elongated member along the circumferential direction of the blade root portion 31.

Alternatively, the reinforcing plates (7, 8) may be provided in a shape varying portion of an inner wall surface of the blade root portion 31 that results from a variation in the thickness of the laminated layers of the fiber reinforced resin forming the blade root portion 31. In an illustrative embodiment depicted in FIG. 4A and FIG. 4B, each reinforcing plate (7, 8) has a thickness distribution with respect to the blade length direction such that, in the shape varying portion of the inner wall surface of the blade root portion 31, the total thickness of the blade root portion 31 and the reinforcing plate (7, 8) gradually decreases toward the blade tip side.

In the blade root portion 31 of the wind turbine blade 3, a fastener hole 38 may be formed into which a fastener (for example, a nut for a fastening bolt) used to attach the blade root portion 31 to the hub 2 via the blade pitch bearing is inserted. In this case, the reinforcing plates (7, 8) may be installed in an area located further toward the blade tip side than the fastener hole 38 so as to avoid interfering with an installation and removal operation for the wind turbine blade 3.

Each reinforcing plate (7, 8) may be shaped to extend along the inside surface of the blade root portion 31 as depicted in FIG. 4A, FIG. 4B, FIG. 5A, and FIG. 5B.

That is, in a cross section along the blade length direction, if the inside surface of the blade root portion 31 has a shape varying portion (for example, a stepped portion) resulting from a variation in the thickness of the laminated layers of the reinforced resin forming the blade root portion 31, a lower surface of each reinforcing plate (7, 8) opposite to the inside surface of the blade root portion 31 may also have a shape varying portion (for example, a stepped portion) corresponding to the inside surface of the blade root portion 31, as depicted in FIG. 4A and FIG. 4B. Alternatively, in a cross section along a radial direction of the blade root portion 31, if the inside surface of the blade root portion 31 has a curved shape, the lower surface of the reinforcing plate (7, 8) opposite to the inside surface of the blade root portion 31 may also have a curved shape (for example, a circular arc shape) corresponding to the inside surface of the blade root portion 31, as depicted in FIG. 5A and FIG. 5B.

Unlike a configuration in which each reinforcing plate (7, 8) has a shape irrelevant to the inside surface of the blade root portion 31, the above-described configuration allows a gap with a substantially uniform size to be formed between the inside surface of the blade root portion 31 and the reinforcing plate (7, 8). Consequently, if the reinforcing plate (7, 8) is attached to the inside surface of the blade root portion 31 using an adhesive 11, the adhesive strength of the reinforcing plate (7, 8) can be improved.

In several embodiments, in the wind turbine blade 3 in the windmill 1, a circular ring-like blade root plate 9 (partitioning plate) is fixed (for example, fitting fixation) along an inner circumference of the cylindrical blade root portion 31 in order to suppress deformation (ovalization) of the blade root portion 31. The blade root plate 9 may be installed before the suction-side reinforcing plate 7 and the pressure-side reinforcing plate 8 are provided. Thus, in a case where the blade root plate 9 is already installed and the suction-side reinforcing plate 7 and the pressure-side reinforcing plate 8 are attached afterward, the blade root plate 9 may interfere installation of the reinforcing plates (7, 8) that have a sufficient length to exhibit a high reinforcing effect against possible flexural deformation in the blade length direction.

Thus, in several embodiments, openings 91, 92 are formed in the blade root plate 9, and the reinforcing plates (7, 8) are arranged so as to pass through the openings (91, 92) corresponding to the reinforcing plates (7, 8), respectively. In this case, the openings 91, 92 may have a size enough to allow the suction-side reinforcing plate 7 and the pressure-side reinforcing plate 8 to penetrate.

The openings 91, 92 formed in the blade root plate 9 may be closed by a cover plate 94 after attachment of the suction-side reinforcing plate 7 and the pressure-side reinforcing plate 8. The openings 91, 92 may be closed, for example, by the blade root plate sandwiched between a pair of the cover plates 94 each of which is larger (wider) than each of the openings 91, 92. In an illustrative embodiment depicted in FIG. 4B, the opening 92 in the blade root plate 9 is closed by the pair of cover plates 94 provided adjacent to the blade root plate 9 on the respective sides of the blade root plate 9 in the blade length direction. Thus, the openings 91, 92 are closed using the cover plates 94 to allow the strength of the blade root plate 9 to be maintained.

The cover plates 94 may be fixed to the blade root plate 9 and the reinforcing plates (7, 8) with an adhesive not depicted in the drawings.

As depicted in FIG. 6 and FIG. 7, a plurality of through-holes 40 for adhesive injection is formed in each of the pressure-side reinforcing plates 8 at a central position in a width direction and along the longitudinal direction. Similar through-holes 40 are formed in each of the suction-side reinforcing plates 7.

The adhesive 11 is injected via the through-holes 40 to allow appropriate filling of a space (junction area) between a bonding surface of each of the suction- and pressure-side reinforcing plates 7 and 8 and the inside surface of the blade root portion 31. This enables the adhesive strength to be made more reliable.

As depicted in FIG. 6, a plurality of the through-holes 40 may be formed in each reinforcing plate (7, 8) in a longitudinal direction thereof (in the example illustrated in FIG. 6, the plurality of through-holes 40 is arrayed along the blade length direction). Consequently, the gap between the lower surface of the reinforcing plate (7, 8) and the inside surface of the blade root portion 31 can be appropriately filled with the adhesive 11.

As depicted in FIG. 6 and FIG. 7, the pressure-side reinforcing plates 8 are provided on the inside surface of the blade root portion 31 via spacers 50 each cross-sectionally shaped, for example, like a wedge. A plurality of the spacers 50 is arranged for each of the pressure-side reinforcing plates 8. In several embodiments, a plurality of pairs of the spacers 50 may be arranged at a plurality of positions in the longitudinal direction of each reinforcing plate (pressure-side reinforcing plate 8) so as to support both sides of the reinforcing plate (pressure-side reinforcing plate 8) in the circumferential direction of the blade root portion 31. In an illustrative embodiment depicted in FIG. 7, a pair of the spacers 50 is provided at both ends of each reinforcing plate (pressure-side reinforcing plate 8) in the longitudinal direction (a total of four spacers 50) to support both sides of the reinforcing plate (pressure-side reinforcing plate 8) in the circumferential direction of the blade root portion 31.

Each suction-side reinforcing plate 7 is provided on the inside surface of the blade root portion 31 via similar spacers 50.

The spacers 50 thus provided allows appropriate formation of a space into which the adhesive 11 used to bond the suction-side reinforcing plates 7 and the pressure-side reinforcing plates 8 to the blade root portion 31 is injected. The spacers 50 also allow the suction-side reinforcing plates 7 and the pressure-side reinforcing plates 8 to be restrained from being tilted under the effect of recesses and protrusions on the inside surface of the blade root portion 31.

As depicted in FIG. 6 and FIG. 7, an adhesive 10 is provided around each pressure-side reinforcing plate 8 so as to be tapered cross-sectionally. The adhesive 10 thus provided enables possible stress concentration to be avoided, allowing the adhesive strength to be further improved. The adhesive 10 may have the same composition as that of the above-described adhesive 11.

At least one adhesive outlet 20 that is not filled with the adhesive 10 is provided around each pressure-side reinforcing plate 8. In this case, the adhesive outlet 20 may be provided on both sides of each reinforcing plate (pressure-side reinforcing plate 8) in the circumferential direction of the blade root portion 31. In the present embodiment, two adhesive outlets 20 are provided near a central portion of the pressure-side reinforcing plate 8 in the longitudinal direction. However, the number and positions of the adhesive outlets 20 are not limited to this example. The adhesive 10 and the adhesive outlets 20 are similarly provided for the suction-side reinforcing plates 7.

When the adhesive 10 is thus provided around each of the suction-side reinforcing plates 7 and the pressure-side reinforcing plates 8, the space into which the adhesive 11 is injected can be reliably formed between the inside surface of the blade root portion 31 and each of the suction-side reinforcing plates 7 and the pressure-side reinforcing plates 8, and can be reliably filled with the adhesive 11.

Each of the suction-side reinforcing plates 7 and the pressure-side reinforcing plates 8 is formed by laminating layers of the fiber reinforced resin such as GFRP or CFRP. As is the case with the wind turbine blade 3, reinforced fibers are arranged in each of the reinforcing plates to provide an appropriate bending strength in the longitudinal direction. Each of the reinforcing plates (7, 8) may be, for example, a unidirectional (UD) material in which reinforced fibers are arranged in one direction along the longitudinal direction. In this case, when attached to the inside surface of the blade root portion 31, the reinforcing plate (7, 8) is oriented such that an extension direction f the reinforced fibers in the UI) material extends along the blade length direction of the wind turbine blade 3.

Figure 8:
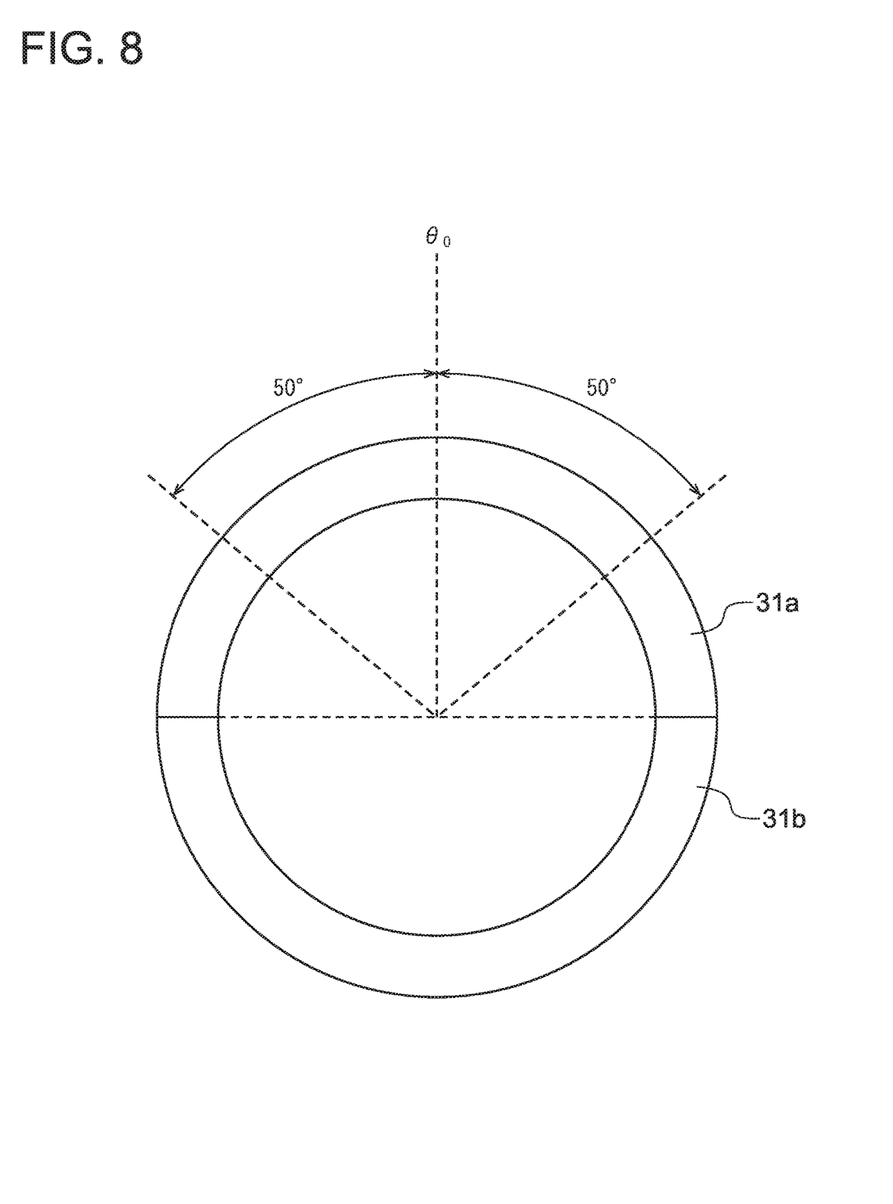
FIG. 8 is a diagram illustrating an attachment range of the reinforcing plate in a half section.

In the present embodiment, the two suction-side reinforcing plates 7 and the two pressure-side reinforcing plates 8 are provided. The reason why the reinforcing plate is thus divided into a plurality of pieces is consideration of, for example, work efficiency for operators. For example, when one reinforcing plate is approximately 20 kg in weight, the operator can carry the reinforcing plate by hand.

in several embodiments, as depicted in FIG. 8, the wind turbine blade 3 is configured by laminating a suction-side half section 31a including a suction-side coat 33 and an area of the blade root portion 31 on an extension of the suction-side coat 33 to a pressure-side half section 31b including a pressure-side coat 35 and an area of the blade root portion 31 on an extension of the pressure-side coat 35.

In the wind turbine blade 3 configured as described above, the suction-side reinforcing plates 7 are desirably provided near the center of a circular arc of the suction-side half section 31a in a cross section of the suction-side half section 31a.

In particular, when the angular position of the center of the circular arc in a circumferential direction of the suction-side half section 31a is denoted by $\theta_0$ [°], the suction-side reinforcing plates 7 are desirably provided within an angular range of $\theta_0-50 \leq \theta \leq \theta_0+50$.

Similarly, the pressure-side reinforcing plate 8 are desirably provided near the center of a circular arc of the pressure-side half section 31b in a cross section of the pressure-side half section 31b. In particular, when the angular position of the center of the circular arc in a circumferential direction of the pressure-side half section 31b is denoted by $\theta_0$ [°], the pressure-side reinforcing plates 8 are desirably provided within an angular range of $\theta_0-50 \leq \theta \leq \theta_0+50$.

Now, a method for attaching the reinforcing plates (7, 8) to the wind turbine blade 3 will be described, First, a case where the pressure-side reinforcing plates 8 are attached to the blade root portion 31 will be described.

The wind turbine rotor 5 of the windmill 1 is rotated and stopped to place one of a. plurality of the wind turbine blades 3 that is to be reinforced (the wind turbine blade 3 to which the pressure-side reinforcing plates 8 are attached) at a position with an azimuth angle of 90°. The wind turbine rotor 5 is then locked. A pitch angle of the wind turbine blade 3 is moved to a full feather pitch angle.

In the description, the wind turbine blade 3 to be reinforced is stopped at an azimuth angle of 90°, but the azimuth angle at which the wind turbine blade 3 to be reinforced is stopped is not limited to this. For example, the wind turbine rotor may be stopped so as to position the wind turbine blade 3 to be reinforced within a first azimuth angular range of 60° or more and 120° or less.

The azimuth angle is angle refers to an angle between a predetermined reference and the axis of the wind turbine blade 3 in a plane of rotation of the wind turbine blade 3, and the reference corresponds to a state where the wind turbine blade 3 is positioned at the uppermost portion. The azimuth angle is 0° when the wind turbine blade 3 is positioned at the uppermost portion of the windmill 1 and is 180° when the wind turbine blade 3 is positioned at the lowermost portion of the windmill 1. The azimuth angle is defined on a clockwise basis as viewed from a position where a viewer stands in front of the wind turbine rotor 5 of the upwind windmill 1.

The full feather pitch angle is indicative of a pitch angle parallel to the direction of the wind. Using the full feather pitch as the pitch angle means that a line with which the leading edge 36 and the trailing edge 37 of the wind turbine blade 3 are connected together is generally horizontal.

Setting the wind turbine blade 3 at such a position allows the installation position of the pressure-side reinforcing plates 8 to be set in a floor direction instead of a ceiling direction inside the wind turbine blade 3 positioned in the horizontal direction. This enables operations to be efficiently and safely performed. The operations inside the wind turbine blade 3 can be more safely performed.

On the other hand, when the suction-side reinforcing plates 7 are attached to the blade root portion 31, the wind turbine rotor 5 of the windmill 1 is rotated and stopped to place the wind turbine blade 3 to be reinforced to which the suction-side reinforcing plates 7 are attached, at a position with an azimuth angle of 270°. The wind turbine rotor 5 is then locked. The pitch angle of the wind turbine blade 3 to be reinforced is moved to the full feather pitch angle.

In the description, the wind turbine blade 3 to be reinforced is stopped at an azimuth angle of 270°, but the azimuth angle at which the wind turbine blade 3 to be reinforced is stopped is not limited to this. For example, the wind turbine rotor may be stopped so as to position the wind turbine blade 3 to be reinforced within a second azimuth angular range of 240° or more and 300° or less.

Setting the wind turbine blade 3 at such a position allows the installation position of the suction-side reinforcing plates 7 to be set in the floor direction instead of the ceiling direction inside the wind turbine blade 3 positioned in the horizontal direction. This enables operations to be efficiently and safely performed.

After the wind turbine blade 3 is set at a position suitable for an installing operation for the pressure-side reinforcing plates 8, the opening 92 is formed in the blade root plate (partitioning plate) 9 to allow the pressure-side reinforcing plates 8 to be penetrated therethrough.

When the suction-side reinforcing plates 7 are attached to the blade root portion 31, the opening 91 is formed in the blade root plate 9 to allow the suction-side reinforcing plates 7 to be penetrated therethrough.

Subsequently, the pressure-side reinforcing plates 8 are placed at a predetermined installation position. At this time, the pressure-side reinforcing plates 8 are placed on the inside surface of the blade root portion 31 via the above-described spacers 50. The spacers 50 form a gap (space) between the blade root portion 31 and each pressure-side reinforcing plate 8 into which the adhesive 11 is injected.

When attached to the blade root portion 31, the suction-side reinforcing plates 7 are similarly placed at a predetermined installation position via the spacers 50.

After the pressure-side reinforcing plates 8 are placed, the adhesive 10 is provided around each pressure-side reinforcing plate 8 so as to be tapered cross-sectionally as depicted in FIG. 6 and FIG. 7. Around each pressure-side reinforcing plate 8, there are a plurality of places where the adhesive 10 is not applied—a plurality of positions (in the example illustrated in FIG. 6, two positions for each pressure-side reinforcing plate 8) where the adhesive outlets 20 are provided.

Similar operations are performed when the suction-side reinforcing plates 7 are attached to the blade root portion 31. That is, the adhesive 10 is provided around each suction-side reinforcing plate 7 so as to be tapered cross-sectionally. Around each suction-side reinforcing plate 7, there are a plurality of places where the adhesive 10 is not applied—a plurality of positions (in the example illustrated in FIG. 6, two positions for each suction-side reinforcing plate 7) where the adhesive outlets 20 are provided.

After the adhesive 10 is applied to the periphery of each pressure-side reinforcing plate 8, the adhesive 11, that is, an adhesive resin, is injected into the space between the inside surface of the blade root portion 31 and each pressure-side reinforcing plate 8 through the through-holes 40. In this case, the adhesive 11 is injected into the space to the degree that the adhesive 11 injected through the adhesive outlets 20 pours from the adhesive outlets 20. The formation of the adhesive outlets 20 allows an injection state of the adhesive 11 to be checked, facilitating injection of an appropriate amount of adhesive 11.

Similar operations are performed when the suction-side reinforcing plates 7 are attached to the blade root portion 31. That is, after the adhesive 10 is applied to the periphery of each suction-side reinforcing plate 7, the adhesive (adhesive resin) 11 is injected into the space between the inside surface of the blade root portion 31 and each suction-side reinforcing plate 7 through the through-holes 40.

After each pressure-side reinforcing plate 8 is fixedly bonded, the opening 92 in the blade root plate 9 is closed. The opening 92 in the blade root plate 9 is closed by, for example, two fiber reinforced resin plates or metal plates larger (wider) than the opening 92 so as to sandwich the opening 92 between side surfaces of the blade root plate 9.

After the suction-side reinforcing plates 7 are fixedly bonded, the opening 91 in the blade root plate 9 is closed.

The embodiments of the present invention have been described. However, the present invention is not limited to the above-described embodiments and includes variations of the embodiments and appropriate combinations of the variations.

Not only do expressions for relative or absolute arrangements such as "in a certain direction", "along a certain direction", "parallel", "orthogonal", "central", "concentric", and "coaxial" exactly represent such arrangements but also represent relative displacements with tolerances or such angles or distances as allow the same functions to be fulfilled.

For example, not only do expressions for equal states of things such as "the same", "equal", and "homogeneous" represent exactly equal states but also represent states with tolerances or such differences as allow the same functions to be fulfilled.

Furthermore, in the present invention, the expression "comprising a component", "including a component", or "having a component" is not an exclusive expression that excludes the existence of other components.

The invention claimed is:

1. A wind turbine blade comprising:
   a hollow blade main body having a plurality of laminated layers of fiber reinforced resin and a cylindrical blade root portion, and extending from the blade root portion along a blade length direction; and
   a reinforcing plate provided in contact with an inside surface of the blade root portion and formed of an elongated member having a dimension along the blade length direction that is larger than a dimension along a circumferential direction of the blade root portion, wherein the cylindrical blade root portion includes a shape-varying portion in which a shape of the inside surface of the blade root portion varies according to a variation in a thickness of the plurality of laminated layers of fiber reinforced resin forming the blade root portion, and wherein the reinforcing plate is attached to the shape-varying portion of the blade root portion.

2. The wind turbine blade according to claim 1, wherein the reinforcing plate is provided on at least one of a pressure side and a suction side of the blade root portion.

3. The wind turbine blade according to claim 1, wherein the reinforcing plate is provided with a through-hole, through which an adhesive is injected, into a space between the inside surface of the blade root portion and the reinforcing plate.

4. The wind turbine blade according to claim 1, wherein the reinforcing plate is shaped along the inside surface of the blade root portion.

5. The wind turbine blade according to claim 1, wherein the blade main body includes:
a suction-side half section and
a pressure-side half section that is joined to the suction-side half section, and
the reinforcing plate is provided, in a cross section of the blade root portion, near a center of a circular arc defined by at least one of the suction-side half section or the pressure-side half section.

6. The wind turbine blade according to claim 5, wherein the reinforcing plate is provided within an angular range of $\theta_0 - 50 \leq \theta \leq \theta_0 + 50$ when an angular position of the center of the circular arc in the circumferential direction of the blade root portion is denoted by $\theta_0$ [°].

7. The wind turbine blade according to claim 1,
wherein the reinforcing plate has a thickness distribution with respect to the blade length direction such that a total thickness of the reinforcing plate and the blade root portion gradually decreases toward a blade tip side.

8. A wind turbine blade comprising:
a hollow blade main body having a cylindrical blade root portion and extending from the blade root portion along a blade length direction; and
a reinforcing plate provided in contact with an inside surface of the blade root portion and formed of an elongated member having a dimension along the blade length direction that is larger than a dimension along a circumferential direction of the blade root portion,
wherein the reinforcing plate is attached to the inside surface of the blade root portion with an adhesive, and
the adhesive is provided around the reinforcing plate so as to be tapered cross-sectionally.

9. A wind turbine blade comprising:
a hollow blade main body having a cylindrical blade root portion and extending from the blade root portion along a blade length direction;
a reinforcing plate provided in contact with an inside surface of the blade root portion and formed of an elongated member having a dimension along the blade length direction that is larger than a dimension along a circumferential direction of the blade root portion; and
a partitioning plate provided in the blade root portion to partition an internal space of the blade main body into a root area and a tip area,
wherein the partitioning plate has an opening through which the reinforcing plate penetrates.

10. The wind turbine blade according to claim 9, further comprising a cover plate provided adjacent to the partitioning plate in the blade length direction so as to close the opening.

11. A reinforcing method for a wind turbine blade, the method comprising:
a placing step of placing a reinforcing plate inside a blade root portion of a hollow blade main body extending from a blade root along a blade length direction, the reinforcing plate being formed of an elongated member having a dimension along the blade length direction that is larger than a dimension along a circumferential direction of the blade root portion;
a bonding step of bonding fixedly the placed reinforcing plate to an inside surface of the blade root portion; and
a stopping step of stopping a wind turbine rotor such that the wind turbine blade to be reinforced is positioned within a first azimuth angular range of 60 degrees or more and 120 degrees or less or a second azimuth angular range of 240 degrees or more and 300 degrees or less,
wherein the placing step is executed after the stopping step.

12. The reinforcing method for a wind turbine blade according to claim 11, wherein
in the placing step, the reinforcing plate is placed on the inside surface of the blade root portion via a spacer, and
in the bonding step, an adhesive is injected into a space formed by the spacer between the reinforcing plate and the inside surface of the blade root portion.

13. The reinforcing method for a wind turbine blade according to claim 11, wherein
the reinforcing plate includes a through-hole into which an adhesive is injected, and
the bonding step includes a step of providing the adhesive around the reinforcing plate and a step of injecting the adhesive through the opening.

14. The reinforcing method for a wind turbine blade according to claim 11, wherein
in the stopping step, a pitch angle of the wind turbine blade to be reinforced is shifted to a feather side, and
in the placing step, the reinforcing plate is attached to at least one of a pressure side or a suction side of the blade root portion.

* * * * *